US009325640B2

(12) United States Patent
Lee et al.

(10) Patent No.: US 9,325,640 B2
(45) Date of Patent: Apr. 26, 2016

(54) WIRELESS NETWORK DEVICE BUFFERS

(75) Inventors: Jung Gun Lee, Mountain View, CA (US); Bo Han, Summit, NJ (US); Sung-Ju Lee, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 723 days.

(21) Appl. No.: 13/560,685

(22) Filed: Jul. 27, 2012

(65) Prior Publication Data
US 2014/0032742 A1  Jan. 30, 2014

(51) Int. Cl.
*H04L 12/861* (2013.01)
*G06F 15/173* (2006.01)
*G06F 13/28* (2006.01)

(52) U.S. Cl.
CPC ...................... *H04L 49/90* (2013.01)

(58) Field of Classification Search
CPC ........ G06F 3/16; G06F 12/023; H04W 52/02; H04W 88/04; H04L 49/90
USPC ...................... 709/224; 710/22; 370/428, 316
See application file for complete search history.

(56) References Cited

U.S. PATENT DOCUMENTS

| | | | |
|---|---|---|---|
| 6,175,900 B1 * | 1/2001 | Forin et al. ..................... | 711/156 |
| 7,215,641 B1 | 5/2007 | Bechtolsheim et al. | |
| 7,412,004 B2 * | 8/2008 | Faller ............................. | 375/242 |
| 7,474,676 B2 | 1/2009 | Tao et al. | |
| 7,593,417 B2 * | 9/2009 | Wang et al. .................... | 370/428 |
| 7,636,368 B2 | 12/2009 | Jang et al. | |
| 7,688,856 B2 | 3/2010 | Jang et al. | |
| 7,978,607 B1 | 7/2011 | Halabi et al. | |
| 8,665,745 B2 * | 3/2014 | Lundin et al. ................. | 370/252 |
| 2005/0169206 A1 * | 8/2005 | Nozaki ................. | H04W 88/04 370/316 |
| 2008/0091851 A1 * | 4/2008 | Sierra ............................ | 710/22 |
| 2011/0292901 A1 * | 12/2011 | Pettersson et al. ............ | 370/329 |
| 2011/0310738 A1 * | 12/2011 | Lee et al. ....................... | 370/235 |
| 2012/0087396 A1 * | 4/2012 | Nimbalker et al. ........... | 375/219 |
| 2013/0083654 A1 * | 4/2013 | Lee et al. ....................... | 370/230 |
| 2013/0254462 A1 * | 9/2013 | Whyte ................. | H04L 69/324 711/103 |

OTHER PUBLICATIONS

Appenzeller, Guido, et al., "Sizing Router Buffers", Stanford HPNG Technical Report, 2004.
Dhamdhere, Amogh, et al., "Open Issues in Router Buffer Sizing, in Computer" Communication Review, Jan. 2006.
Kellett, Christopher M., et al., "Sizing Internet Router Buffers, Active Queue Management, and the Lur'e Problem", in Proc. of IEEE CDC, 2006.
Li, Tianji, et al., "Buffer Sizing for 802.11-based Networks", IEEE/ACM Transactions on Networking (TON), vo. 19 No. 1, Feb. 2011.
Malone, D., et al., "On Buffer Sizing for Voice in 802.11 WLANs" IEEE Communications Letters, vol. 10, No. 10, Oct. 2006.
Pilosof, Saar, et al., "Understanding TCP fairness over Wireless LAN", in Proc. of IEEE INFOCOM 2003.

(Continued)

*Primary Examiner* — David Lazaro
*Assistant Examiner* — Zi Ye
(74) *Attorney, Agent, or Firm* — Mannava & Kang

(57) ABSTRACT

A wireless network device includes operating system layer buffers used by an operating system and driver layer buffers used by a wireless network interface driver in the device. Memory stores a capacity bitmap managed by the wireless network interface driver. The capacity bitmap identifies a current capacity of each of the driver layer buffers and the capacity bitmap may be provided to the operating system.

13 Claims, 4 Drawing Sheets

(56) References Cited

OTHER PUBLICATIONS

Stanojevic, Rade, et al., "Adaptive Tuning of Drop-Tail Buffers for Reducing Queueing Delays", IEEE Communications Letters, vol. 10, No. 7, Jul. 2006.

Vu-Brugier, G., "A Critique of Recently Proposed Buffer-Sizing Strategies", ACM Computer Communication Review, vol. 37. No. 1, Jan. 2007.

Wischik, Damon, et al., "Part I: buffer sizes for core router", ACM Computer Communication Review, vol. 35, No. 3, Jul. 2005.

Selvam T., et al., A Frame Aggregation Scheduler for IEEE 802.11N, MIT Campus of Anna University, on pp. 1-5, Jan. 29-31, 2010. < http://comm.au-kbc.org/Docs/papers/A_Frame_Aggregation_Scheduler_for_IEEE_802_11n.pdf >.

* cited by examiner

WIRELESS NETWORK DEVICE BUFFERS

BACKGROUND

Devices that send or receive data via a computer network may use a buffer to store data waiting to be transmitted to a destination via the network or to store received data waiting to be processed. The devices may include wireless network devices that send or receive data via a wireless network. The size of the buffer can impact throughput. For example, if the buffer size is too large, the queuing delay increases and hence the end-to-end packet delay may become significant and unacceptable for delay sensitive applications (e.g., voice). On the other hand, if the buffer size is too small, packets are dropped as the buffer gets full.

BRIEF DESCRIPTION OF THE DRAWINGS

The embodiments may be better understood and their features made apparent by referencing the accompanying drawings. The drawings illustrate examples of the embodiments described herein.

DETAILED DESCRIPTION

Figure 1:
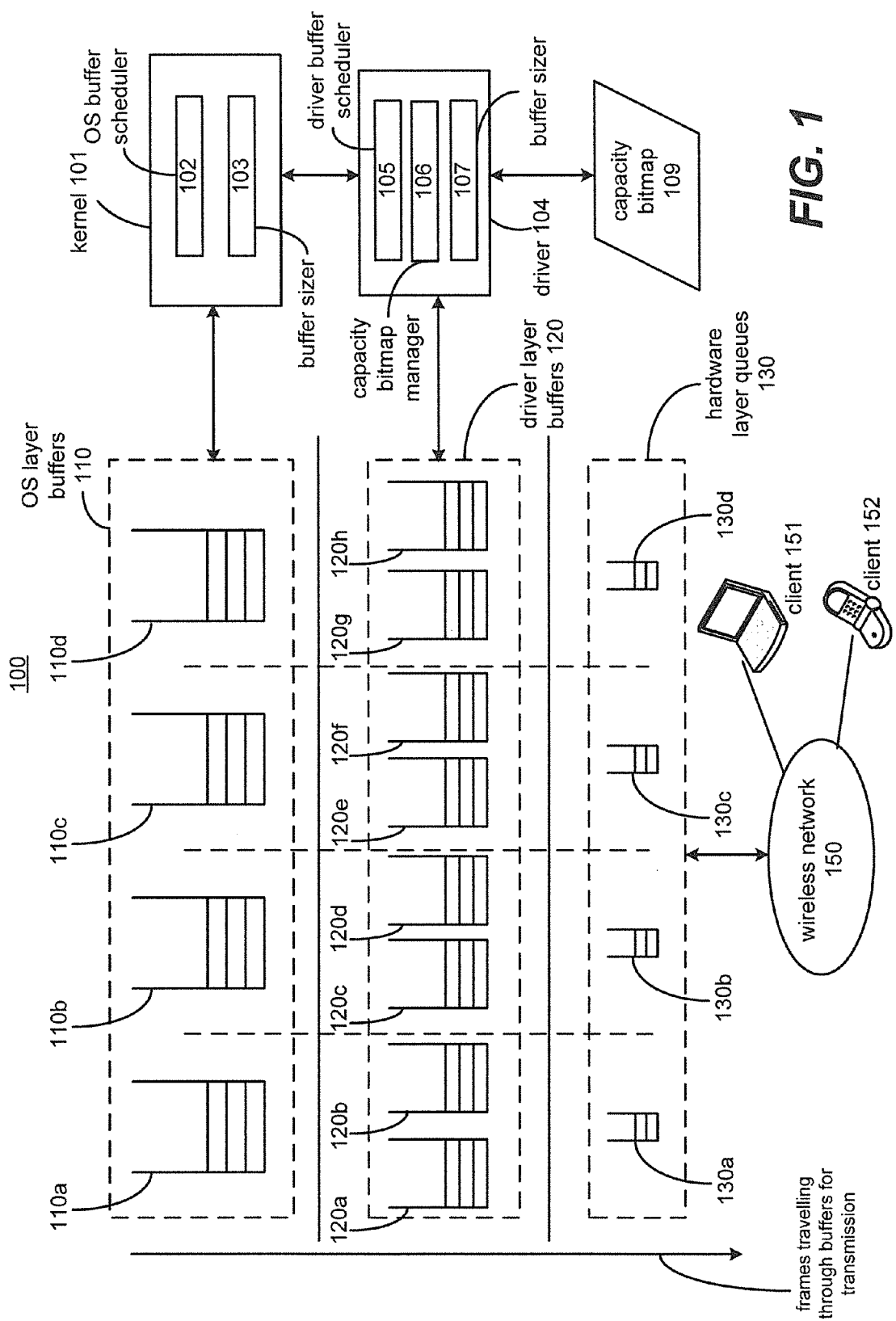
FIG. 1 illustrates a wireless network device.

For simplicity and illustrative purposes, the principles of the embodiments are described by referring mainly to examples thereof. In the following description details are set forth in order to provide a thorough understanding of the embodiments. It is apparent that the embodiments may be practiced without limitation to all the specific details. Also, the embodiments may be used together in various combinations.

According to an embodiment, a wireless network device that uses 802.11 or another wireless network protocol to communicate over a wireless network includes multiple layers of buffers. The multiple layers of buffers may include operating system (OS) layer buffers, driver layer buffers and hardware layer queues. The OS layer buffers store packets for the OS. For example, the OS layer buffers are used by a kernel in the OS to send and receive packets. The driver layer buffers are used by a wireless network interface driver. The wireless network interface driver may operate at the media access control (MAC) layer and controls the circuitry of a wireless network interface and allows the OS to interact with the wireless network interface to send and receive packets in the wireless network. The driver layer buffers store packets to be communicated between the OS and the wireless network interface. The hardware layer queues may comprise queues in the wireless network interface. Examples of the wireless network interface may be a radio chipset in a wireless access point (WAP) or a wireless router or a wireless network interface controller (WNIC) in a personal computer. The wireless network interface may comprise hardware to send or receive packets in the wireless network according to a wireless network protocol.

The embodiments may be used in a 802.11n network. According to an embodiment, for the driver layer buffers, the size of the buffers may be determined based on frame aggregation and link characteristics. This helps minimize MAC queuing delays without hurting the performance of 802.11n frame aggregation, and thus can improve transmission control protocol (TCP) throughput.

According to an embodiment, for the OS layer buffers, a wireless destination-aware queuing scheme is implemented, which can improve TCP throughput. For example, a capacity bitmap is maintained that identifies the queue status (e.g., how full each buffer is) of buffers in the driver layer. The capacity bitmap may identify each buffer in the driver layer by MAC address associated with a destination. The capacity bitmap may be maintained by the wireless network interface driver and is exposed to the kernel so the kernel can determine which buffers in the driver layer are full. For example, the kernel may hash the MAC address of a frame to be enqueued to the driver layer to determine the current capacity of the driver layer buffer corresponding to the MAC. Enqueue means to place data in a buffer and dequeue means to remove data from a buffer. If the driver layer buffer is full, the kernel may hold or drop the frame and enqueue another frame for a different driver layer buffer that is not full. The capacity bitmap comprises bits identifying the capacity of the driver layer buffers. In one example, the bitmap comprises an index of bits indicating MAC address hash value and capacity for each driver layer buffer associated with the MAC address.

FIG. 1 illustrates buffers in a wireless network device 100. The buffers include OS layer buffers 110, driver layer buffers 120 and hardware layer queues 130. A wireless network device is any device, such as a WAP, router, end user device, that uses 802.11 or another wireless network protocol to communicate over a wireless network, such as wireless network 150. In one example, the wireless network device 100 is a WAP connected to clients, such as clients 151 and 152. A client is a network device in a wireless network that associates with a WAP to get connectivity, for example, to and from the Internet, and to further communicate with other clients via the wireless network. For example, the clients 151 and 152 may comprise end user devices, such as mobile phones, laptops, tablets, or other types of devices. A client may rely on one WAP at any given time for all communications in the wireless network. For example, the clients 151 and 152 rely on the wireless network device 100, assuming it is a WAP, for communications in the wireless network 150. The wireless network device 100 sends and receives frames to and from the clients 151 and 152 via the wireless network 150. The frames may comprise layer 2 communications using MAC addresses.

The OS layer buffers 110 are used by a kernel 101 in an OS for the network device 100 to send and receive packets. In one example the OS layer buffers 110 are queuing discipline (qdisc) buffers for LINUX but the buffers 110 may be used for other types of OS. The driver layer buffers 120 are used by a wireless network interface driver 104 that may operate at the MAC layer to send and receive packets through a wireless network interface of the network device 100. The driver layer buffers 120 store frames to be communicated between the OS and the wireless network interface. The driver layer buffers may be TID (Traffic Identifier) buffers. TID is a number used by 802.11 to provide differentiated QoS for each flow or traffic class. The hardware layer queues 130 may comprise queues in the wireless network interface that store received frames or frames to be sent to destinations via the wireless network 150.

In one example, buffers are provided for different traffic classes. For example, the OS layer buffers 110*a-d* store data for different traffic classes. For example, OS buffer 110*a* stores frames for a first class, OS buffer 110*b* stores frames for a second class and so on. Similarly, the driver layer buffers 120 and the hardware layer queues 130 store frames for different traffic classes. For example, driver layer buffers 120a and 120b store frames for the first class, driver layer buffers 120c and 120d store frames for the second class and so on. Similarly, hardware layer queue 130a stores frames for the first class, hardware layer queue 130b stores frames for the second class and so on. Examples of different traffic classes include BK (background), BE (best effort), VI (video) and VO (voice). Different queuing policies may be applied to different classes because the traffic in different classes may have different requirements. For example, VO may have latency requirements of less than 10 ms but background may not have any latency requirements so the queuing policy may allow for faster transmission of VO frames. More or less than four classes may be used.

The driver layer buffers 120 may include a buffer for each destination serviced by the network device 100. For example, if the network device 100 is a WAP, the clients 151 and 152 are destinations in the WAP's cell. The driver layer buffers 120 include buffers for each of clients 151 and 152. For example, driver layer buffers 120a, 120c, 120e and 120g store frames for client 151 and are associated with the MAC address of client 151. Driver layer buffers 120b, 120d, 120f and 120h store frames for client 152 and are associated with the MAC address of client 152. Also, driver layer buffers 120a-b may be associated with a first traffic class, driver layers 120c-d are associated with a second traffic class and so on. There may be more or less than two clients. In certain instances, frames for a destination or a class may be put into a buffer that is not for the particular destination or class for the frame.

The kernel 101 and driver 104 may include modules and perform functions other than described herein. The functions performed by the kernel 101 and driver 104 that are described herein are related to the buffers shown in FIG. 1.

The kernel 101 may include an OS buffer scheduler 102 and a buffer sizer 103. If the kernel 101 needs to send data to a destination, the kernel 101 enqueues frames including the data in an OS layer buffer which may correspond to the traffic class. The OS buffer scheduler 102 attempts to send frames from the OS layer buffer to the driver layer buffer for the destination. The OS buffer scheduler 102 applies a queuing policy, such as first-in-first-out or another policy, to send frames to the corresponding driver layer buffer.

The OS buffer scheduler 102 also uses a capacity bitmap 109 to determine the current capacity of a driver layer buffer before sending a frame to the driver layer buffer. If the driver layer buffer is full, the OS buffer scheduler 102 does not send the frame to the driver layer buffer and then may attempt to send another frame to another driver layer buffer that is not full. If the driver layer buffer is not full, the OS buffer scheduler 102 sends the frame to the driver layer buffer. The driver 104 exposes the capacity bitmap 109 to the kernel 101 so the OS buffer scheduler 102 can determine the current capacity of each of the driver layer buffers 120. The capacity bitmap 109 may use the MAC addresses of the destinations, such as clients 151 and 152, to determine the capacities of the driver layer buffers 120, as is further described below.

The buffer sizer 103 determines a size of the OS layer buffers 110. In one example, a total size of the OS layer buffers 110 is based on target delay and measured bandwidth. The buffers and queues shown in FIG. 1 may comprise memory to temporarily hold data while it is moved from one place to another. The OS layer buffers 110 may share a memory region. In another example, each of the OS layer buffers 110 is dynamically sized per link based on target delay D (ms) and measured bandwidth N, where N is the number of ACKed frames per millisecond (ms). For example, buffer size S=D*N. If the OS layer buffers 110 cannot determine the number of MAC ACKed frames, then N can be set to the number of successfully dequeued (compared to 'dropped') frames instead of the number of ACKed frames. Also, in one example, the OS layer buffers 110 may be per destination instead of per traffic class so it is easier to adjust buffer size based on link characteristics.

The wireless network interface driver 104 may include a driver buffer scheduler 105, a capacity bitmap manager 106 and a buffer sizer 107. The driver buffer scheduler 105 attempts to send frames from the driver layer buffers 120 to the hardware layer queues 130 for transmission to the destinations. The driver buffer scheduler 105 applies a predetermined queuing policy to send frames to the hardware layer queues 130. Different polices may be applied for different traffic classes. Also, the driver buffer scheduler 105 sends frames for a particular traffic class to the hardware layer queue storing frames for the class.

The driver buffer scheduler 105 may also perform frame aggregation. For example, 802.11 n allows for frame aggregation, which includes sending two or more frames in one transmission. Different conditions may terminate frame aggregation. Examples of conditions to terminate frame aggregation include Block ACK window close, reaching a frame limit, reaching a byte limit, and no more frames in the driver layer buffer to aggregate. The limit on the number of bytes reflects a current link bandwidth, as it may be calculated based on the current PHY bit rate selected by a rate control function. Driver layer buffer size may be determined based on the byte limit as described below.

The buffer sizer 107 determines a size of the driver layer buffers 120. In one example, a total size of the driver layer buffers 120 is based on target delay and measured bandwidth. Each of the driver layer buffers 120 may be dynamically sized. For example, buffer size S=D*N, such as described above.

To dynamically size each of the driver layer buffers, the buffer sizer 107 may dynamically set buffer size limits for each driver layer buffer based on frame aggregation and wireless link characteristics. For example, as described above, a condition for terminating frame aggregation is a byte limit for a frame. The limit on the number of bytes may reflect a current link bandwidth if it is based on bandwidth. The individual buffer size may be calculated based on the byte limit. For example, suppose the frame aggregation byte limit is the number of bytes in 20 frames, the buffer size limit may be set to 2*20=40 frames. Setting the buffer size limit at twice the frame aggregation byte limit is one example of a buffer size. Smaller or larger sizes may be used. If a byte limit is set for each driver layer buffer, it can minimize a situation whereby one buffer hogs the memory region assigned to all the driver layer buffers 120 that can cause frames for another buffer to be dropped for lack of buffer space. Also, a buffer size limit of each driver layer buffer may be based on a number of bytes in the last frame aggregation. In another example, the total per-destination buffer sizes, which may include OS layer buffers 110 and driver layer buffers 120, is D*N. Allowing both the OS layer and driver layer buffers to dynamically size and control their total (per-destination) sizes to be D*N can be difficult. In one example, the driver layer buffer size may be a constant K. The constant K, for example, is just large enough to form one aggregation frame and to control the OS layer buffer to be D*N−K.

The capacity bitmap manager 106 manages the capacity bitmap 109 and exposes the capacity bitmap 109 to the kernel 101. The capacity bitmap 109 includes an identifier for each driver layer buffer and an indication of current capacity of each driver layer buffer. A simplistic example of some information that may be provided in the capacity bitmap 109 is shown in table A below. The MAC address associated with a driver layer buffer is hashed to create an identifier for the buffer, which is included in the capacity bitmap 109. Also, the current capacity of the buffer is determined. In one example, if the current capacity is less than the buffer limit, then a bit representing the capacity for the buffer is set to 0, such as shown in row 1 in table A. Otherwise the bit is set to 1, such as shown in row 2 in table A.

TABLE A

| Hash of MAC Address | Capacity at Limit (0 = no, 1 = yes) |
|---|---|
| 01234F7AXXXXX | 0 |
| 999934F7AXXXXX | 1 |

The capacity bitmap manager 106 periodically determines the capacity of each driver layer buffer 120 and sets the indication of the capacity in the capacity bitmap 109. The capacity bitmap manager 106 also exposes the capacity bitmap 109 to the kernel 101 so the kernel can read the capacity bitmap 109 to determine whether to put frames in a driver layer buffer. Exposing the capacity bitmap 109 may include storing the capacity bitmap 109 in a memory location that is accessible by the kernel 101 or otherwise providing the capacity bitmap 109 to the kernel 101.

Figure 2:
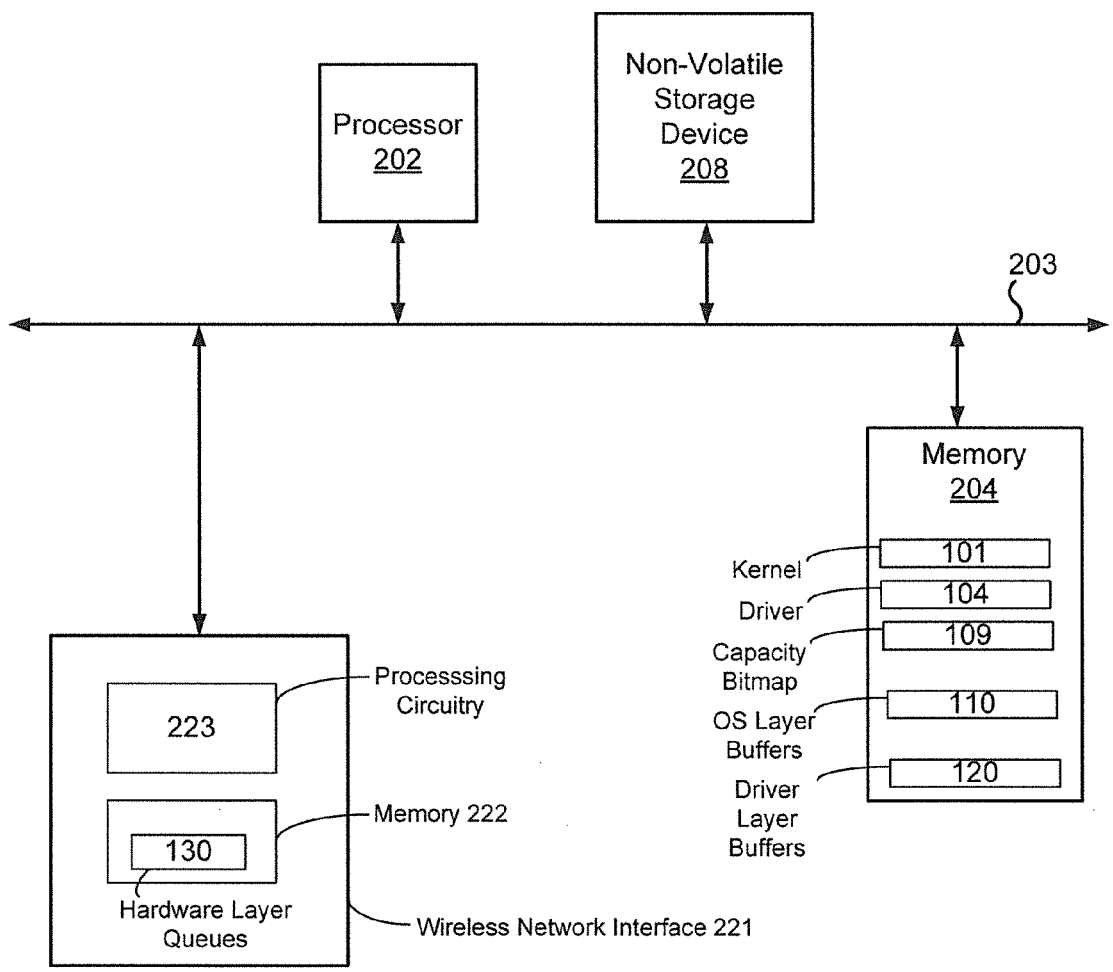
FIG. 2 illustrates a hardware platform.

FIG. 2 illustrates a hardware platform 200 that may be used by the wireless network device 100. The hardware platform 200 may be a platform for a WAP or another type of wireless network device. The components shown in the hardware platform 200 may be used in different types of network devices but the different types of network devices may include different components that are not shown. The hardware platform 200 includes one or more processors or processing circuitry (e.g., application-specific integrated circuit) represented by processor 202, providing an execution platform for executing machine readable instructions including code. The processor 202 may process frames according to executed machine readable instructions. Commands and data from the processor 202 are communicated over a communication bus 203. The hardware platform 200 also includes non-transitory computer readable storage mediums including a memory 204, such as a Random Access Memory (RAM), where machine readable instructions and data used by the machine readable instructions are resident during runtime, and a non-volatile storage device 208. The data storage 208 may include a nonvolatile data storage device where a copy of the machine readable instructions and data are stored.

The memory 204 may store modules that are comprised of machine readable instructions executable by the processor 202 at runtime. The kernel 101 and the driver 104 shown in FIG. 1 may be stored in the memory 204 at runtime. Also, portions of the memory 204 may be used for the OS layer buffers 110 and the driver layer buffers 120 shown in FIG. 1. The capacity bitmap 109 may also be stored in the memory 204.

The hardware platform 200 includes a wireless network interface 221 for communicating in a wireless network, such as the wireless network 150 shown in FIG. 1. The wireless network interface 221 may be a radio in a WAP. The wireless network interface 221 may be used for transmissions between the clients 151 and 152 and the wireless network device 100 in the wireless network 150 shown in FIG. 1. The wireless network interface 221 may include memory 222 and processing circuitry 223. The memory 222 and processing circuitry 223 may be provided in a chipset. The hardware layer queues 130 shown in FIG. 1 may use portions of the memory 222.

Figure 3:
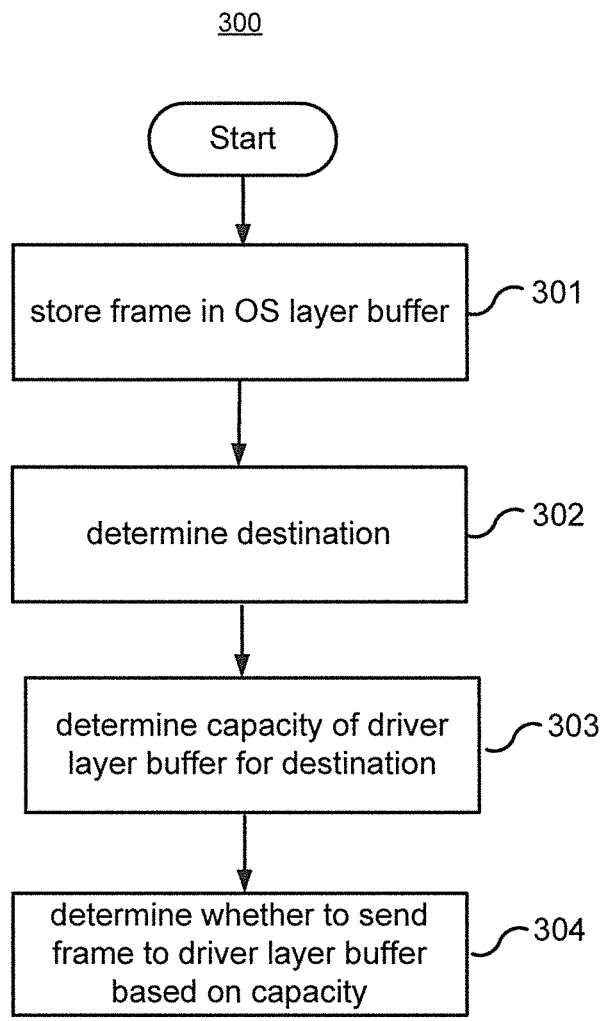
FIG. 3 illustrates a method for enqueuing data in a driver layer buffer.

FIG. 3 shows an example of a method 300 for enqueuing data in a driver layer buffer. The methods 300 and 400, described below, are described with respect to the network device 100 shown in FIG. 1 by way of example. For example, the method 300 may be performed by a WAP or another type of wireless network device. The methods may be performed by other devices.

At 301, a frame is stored in an operating system layer buffer. For example, the OS stores data for a frame in one of the operating system layer buffers 110 that corresponds to the traffic class for the data.

At 302, a destination for the frame is determined. For example, the OS buffer scheduler 102 determines a MAC address of the destination, such as the MAC address of the client 151 if it is the destination.

At 303, a capacity for a driver layer buffer for the destination is determined from a capacity bitmap. For example, the OS buffer scheduler 102 hashes the MAC address to identify bits representing a corresponding capacity for the MAC address in the capacity bitmap 109. Each of the driver layer buffers 120 may store frames for a particular destination and/or for a particular traffic class.

At 304, a determination is made as to whether to send the frame from the OS layer buffer to the driver layer buffer for the destination based on the determined capacity. For example, each driver layer buffer may have a byte limit, which may be adaptively set based on bandwidth or other link characteristics. If the driver layer buffer capacity exceeded a limit, then the frame may be held or dropped, and the OS buffer scheduler 102 attempts to send another frame. If the driver layer buffer capacity does not exceed the limit, then the frame is sent to the driver layer buffer.

Figure 4:
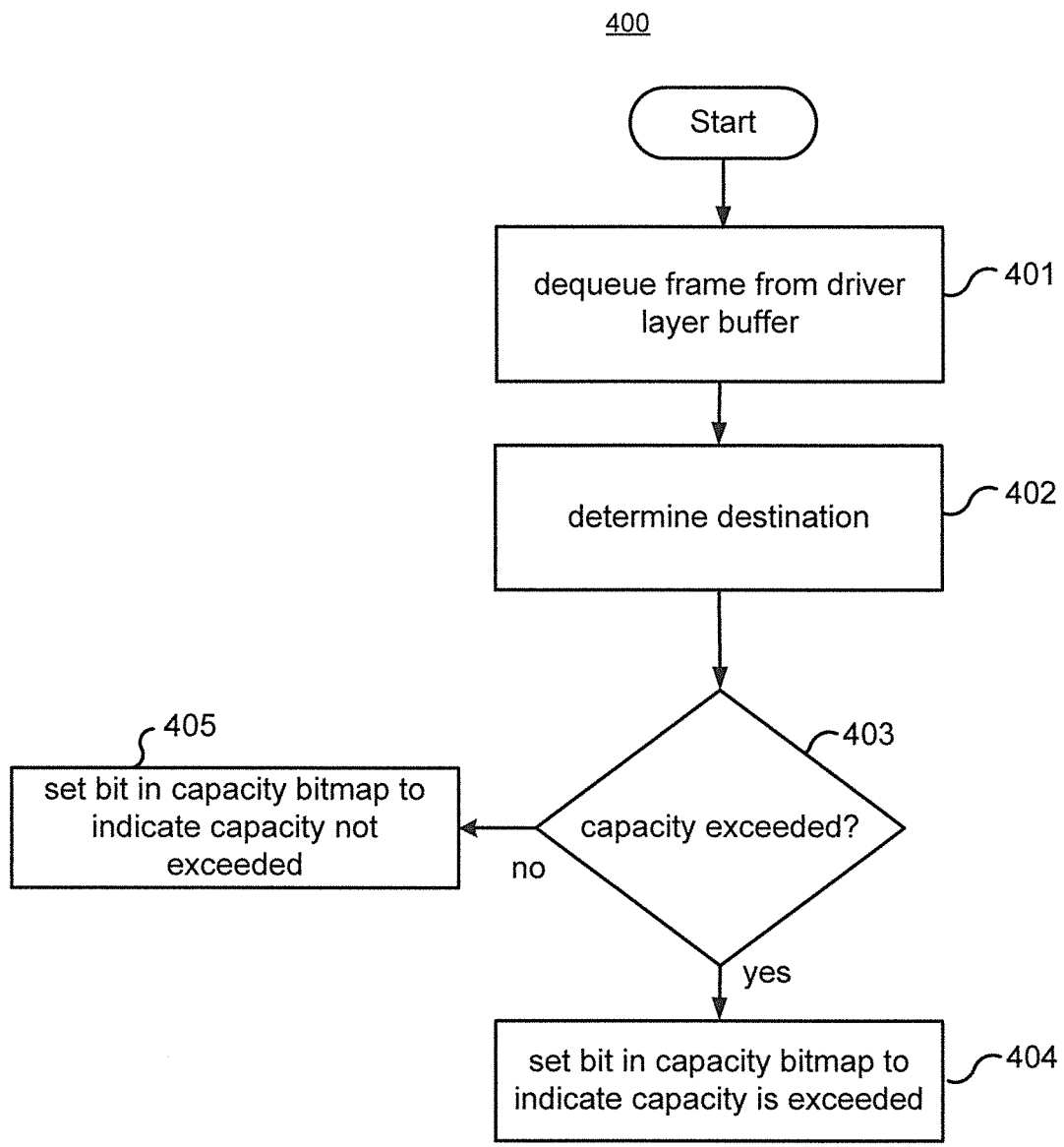
FIG. 4 illustrates a method for managing a capacity bitmap.

FIG. 4 illustrates an example of a method 400 for managing a capacity bitmap, such as the capacity bitmap 109.

At 401, a frame is dequeued from a driver layer buffer. For example, a frame is sent from one of the driver layer buffers 120 to one of the hardware layer queues 130 storing frames for the same traffic class as the driver layer buffer.

At 402, a destination associated with the driver layer buffer is determined. For example, each of the driver layer buffers 120 may be associated with a particular one of the clients 151 and 152. The capacity bitmap manager 106 determines the MAC address of the destination associated with the driver layer buffer. The MAC address may be stored in memory.

At 403, a determination is made as to whether the capacity of the driver layer buffer exceeded a limit based on information in the capacity bitmap 109. For example, each driver layer buffer may have a byte limit, which may be adaptively set based on bandwidth or other link characteristics. If the number of bytes in the buffer exceeds the limit, the capacity bitmap manager 106 sets a bit in the capacity bitmap 109 to indicate that the limit is exceeded at 404. The bit may already indicate that the capacity is exceeded, and in this case the bit is left unchanged. If the capacity is not exceeded, the capacity bitmap manager 106 sets a bit in the capacity bitmap 109 to indicate that the limit is not exceeded at 405. The bit may already indicate that the capacity is not exceeded, and in this case the bit is left unchanged.

While the embodiments have been described with reference to examples, various modifications to the described embodiments may be made without departing from the scope of the embodiments.

What is claimed is:

1. A wireless network device comprising:
operating system (OS) layer buffers used by an OS;
driver layer buffers used by a wireless network interface driver; and
memory storing a capacity bitmap managed by a capacity bitmap manager of the wireless network interface driver, wherein the capacity bitmap manager exposes the capacity bitmap to the OS, determines a current capacity of each of the driver layer buffers, and sets an indication of the current capacity of each of the driver layer buffers in the capacity bitmap, wherein a kernel in the OS is to determine a current capacity of a driver layer buffer of the driver layer buffers from the capacity bitmap responsive to a media access control (MAC) address of a frame to be enqueued to the driver layer buffer, and if the driver layer buffer is full, set a bit in the capacity bitmap to indicate the driver layer buffer is full, and hold or drop the frame and enqueue another frame to be enqueued for a different driver layer buffer of the driver layer buffers that is not full.

2. The wireless network device of claim 1, wherein the driver layer buffers comprise a buffer for each of a plurality of clients receiving frames from the network device over a wireless network, and each buffer is identified based on a MAC address of a corresponding client.

3. The wireless network device of claim 2, wherein the capacity bitmap identifies a capacity of each driver layer buffer based on the MAC address for the client associated with the buffer.

4. The wireless network device of claim 1, wherein a size of each of the driver layer buffers is based on target delay and measured bandwidth.

5. The wireless network device of claim 1, wherein a buffer size limit of each driver layer buffer is based on a number of bytes for a last frame aggregation.

6. The wireless network device of claim 1, wherein a buffer size limit of each driver layer buffer is based on a byte limit for frame aggregation.

7. The wireless network device of claim 1, wherein a total size of the OS layer buffers and/or the driver layer buffers is based on target delay and measured bandwidth.

8. The network device of claim 1, comprising:
a wireless network interface including hardware queues for a plurality of traffic classes and the wireless network interface driver is to send frames from the driver layer buffers to the hardware queues for transmission in the wireless network.

9. The network device of claim 1, wherein the wireless network device comprises a wireless access point.

10. A method for enqueuing data in a driver layer buffer, the method comprising:
storing a frame in an operating system (OS) layer buffer used by a kernel;
determining a destination for the frame;
determining a current capacity of each of a plurality of driver layer buffers by a capacity bitmap manager;
setting an indication of the current capacity of each driver layer buffer in a capacity bitmap;
determining, by a processor, a capacity for a driver layer buffer for the destination from the capacity bitmap; and
determining whether to send the frame from the OS layer buffer to the driver layer buffer for the destination based on the determined capacity, wherein the kernel is to determine a current capacity of a driver layer buffer of the plurality of driver layer buffers from the capacity bitmap responsive to a media access control (MAC) address of a frame to be enqueued to the driver layer buffer, and if the driver layer buffer is full, set a bit in the capacity bitmap to indicate the driver layer buffer is full, and hold or drop the frame and enqueue another frame to be enqueued for a different driver layer buffer of the plurality of driver layer buffers that is not full.

11. The method of claim 10, where the determining of the destination comprises determining a MAC address of the destination and the capacity is determined from the capacity bitmap based on the MAC address of the destination.

12. A method of managing a capacity bitmap indicating a capacity of each of a plurality of driver layer buffers, wherein each driver layer buffer is associated with a different destination, the method comprising:
storing a frame in an operating system (OS) layer buffer used by a kernel;
determining a current capacity of each of the plurality of driver layer buffers by a capacity bitmap manager;
setting an indication of the current capacity of each driver layer buffer in the capacity bitmap;
dequeuing a frame from a driver layer buffer;
determining the destination associated with the driver layer buffer;
determining, by a processor, whether a capacity of the driver layer buffer exceeds a limit;
if the capacity is exceeded, setting a bit in the capacity bitmap associated with the destination to indicate the capacity of the buffer is exceeded; and
if the capacity is not exceeded, setting the bit in the capacity bitmap associated with the destination to indicate the capacity of the buffer is not exceeded, wherein the kernel is to determine a current capacity of a driver layer buffer of the plurality of driver layer buffers from the capacity bitmap responsive to a media access control (MAC) address of a frame to be enqueued to the driver layer buffer, and if the driver layer buffer is full, set a bit in the capacity bitmap to indicate the driver layer buffer is full, and hold or drop the frame and enqueue another frame to be enqueued for a different driver layer buffer of the plurality of driver layer buffers that is not full.

13. The method of claim 12, where the determining of the destination comprises determining a MAC address of the destination, and the bit to be set in the capacity bitmap is determined from the MAC address of the destination.

* * * * *